United States Patent [19]
Barani et al.

[11] Patent Number: 6,119,968
[45] Date of Patent: Sep. 19, 2000

[54] DEVICE FOR FORMING AND COATING SOLID PARTICLES

[75] Inventors: Ruggero Barani; Andrea Nora, both of Modena, Italy

[73] Assignee: ICO Oleodinamici S.p.A., Frazione San Damaso (MO), Italy

[21] Appl. No.: 09/208,001

[22] Filed: Dec. 9, 1998

[30] Foreign Application Priority Data

Dec. 23, 1997 [EP] European Pat. Off. .............. 97830707

[51] Int. Cl.[7] .................................................. B02C 23/26
[52] U.S. Cl. ............................................................ 241/57
[58] Field of Search ........................... 427/212; 118/303, 118/320; 241/57

[56] References Cited

U.S. PATENT DOCUMENTS

| | | |
|---|---|---|
| 4,414,198 | 11/1983 | Michaelson . |
| 4,528,200 | 7/1985 | Coleman . |
| 4,556,175 | 12/1985 | Motoyama et al. ............ 241/57 |
| 5,284,678 | 2/1994 | Hirschfeld et al. ............ 427/212 |

FOREIGN PATENT DOCUMENTS

| | | |
|---|---|---|
| 0 109 771 | 5/1984 | European Pat. Off. . |
| 0 228 633 | 7/1987 | European Pat. Off. . |
| 0 347 402 | 12/1989 | European Pat. Off. . |
| 0 526 394 | 2/1993 | European Pat. Off. . |
| 2 533 459 | 3/1984 | France . |
| 35 01 785 | 7/1986 | Germany . |
| 92 10 989 | 1/1993 | Germany . |
| 861 845 | 3/1961 | United Kingdom . |
| 2 027 662 | 2/1980 | United Kingdom . |
| 2 074 838 | 11/1981 | United Kingdom . |
| 2 196 228 | 4/1988 | United Kingdom . |
| WO 92/01390 | 2/1992 | WIPO . |

OTHER PUBLICATIONS

Chemical Abstracts, vol. 104, No. 13, Mar. 1986, Columbus, Ohio, US; abstract No. 108207, p. 603, col. 1, XP002016842.

*Primary Examiner*—Mark Rosenbaum
*Attorney, Agent, or Firm*—Browdy and Neimark

[57] ABSTRACT

A device for forming and coating solid particles comprises a rotating disc interiorly defining a process chamber and which can assume a rest position in which is interiorly closes the chamber and a working position in which it affords an annular passage through which a process gas is allowed to enter the chamber. A rotary hydraulic motor commands rotation of the disc; two hydraulic linear actuators perform vertical displacement of the disc. Both the motor and the actuators are located immediately below the disc. An especially advantageous use of the device is as a granulator or as a coater of granules.

8 Claims, 3 Drawing Sheets

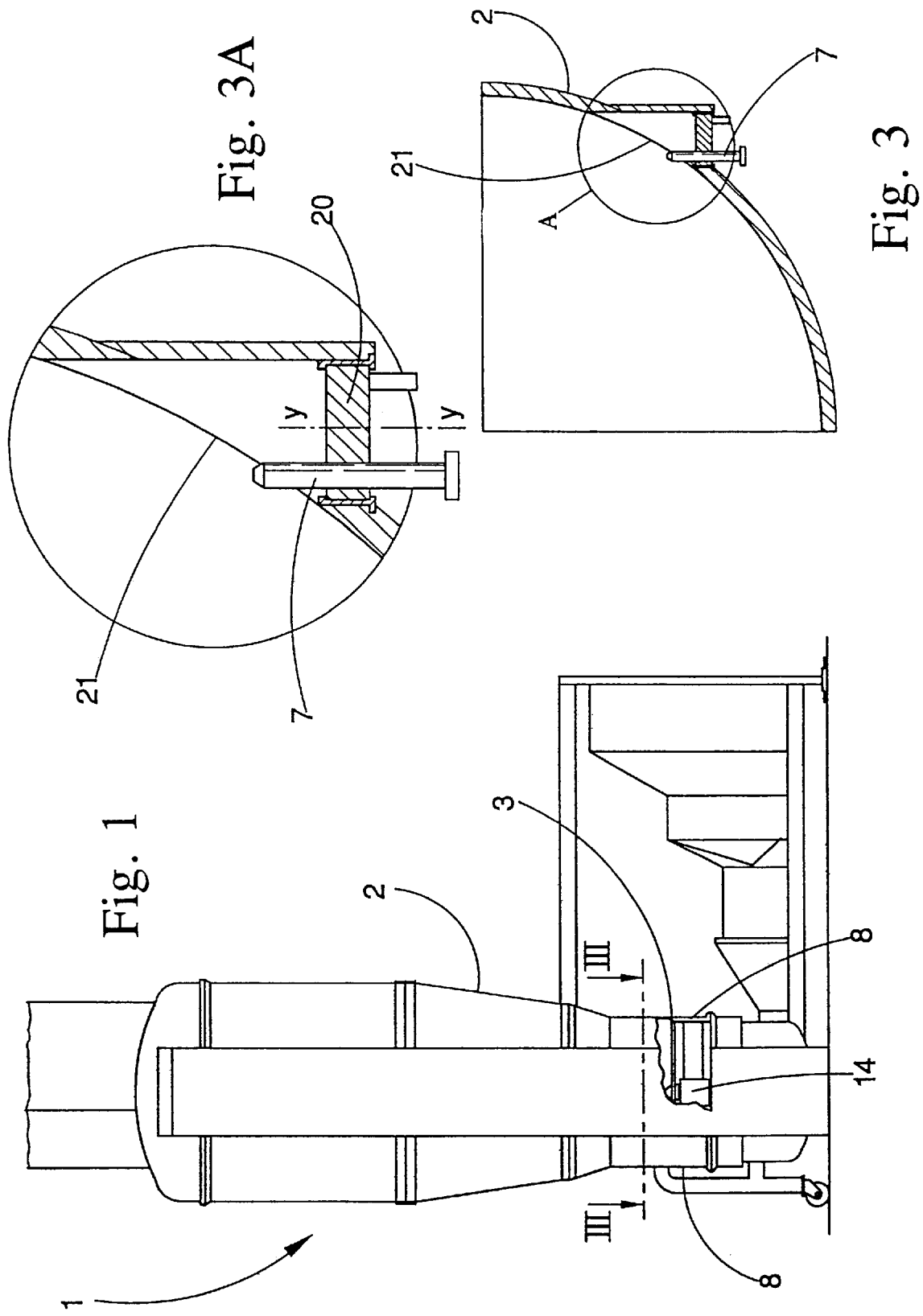

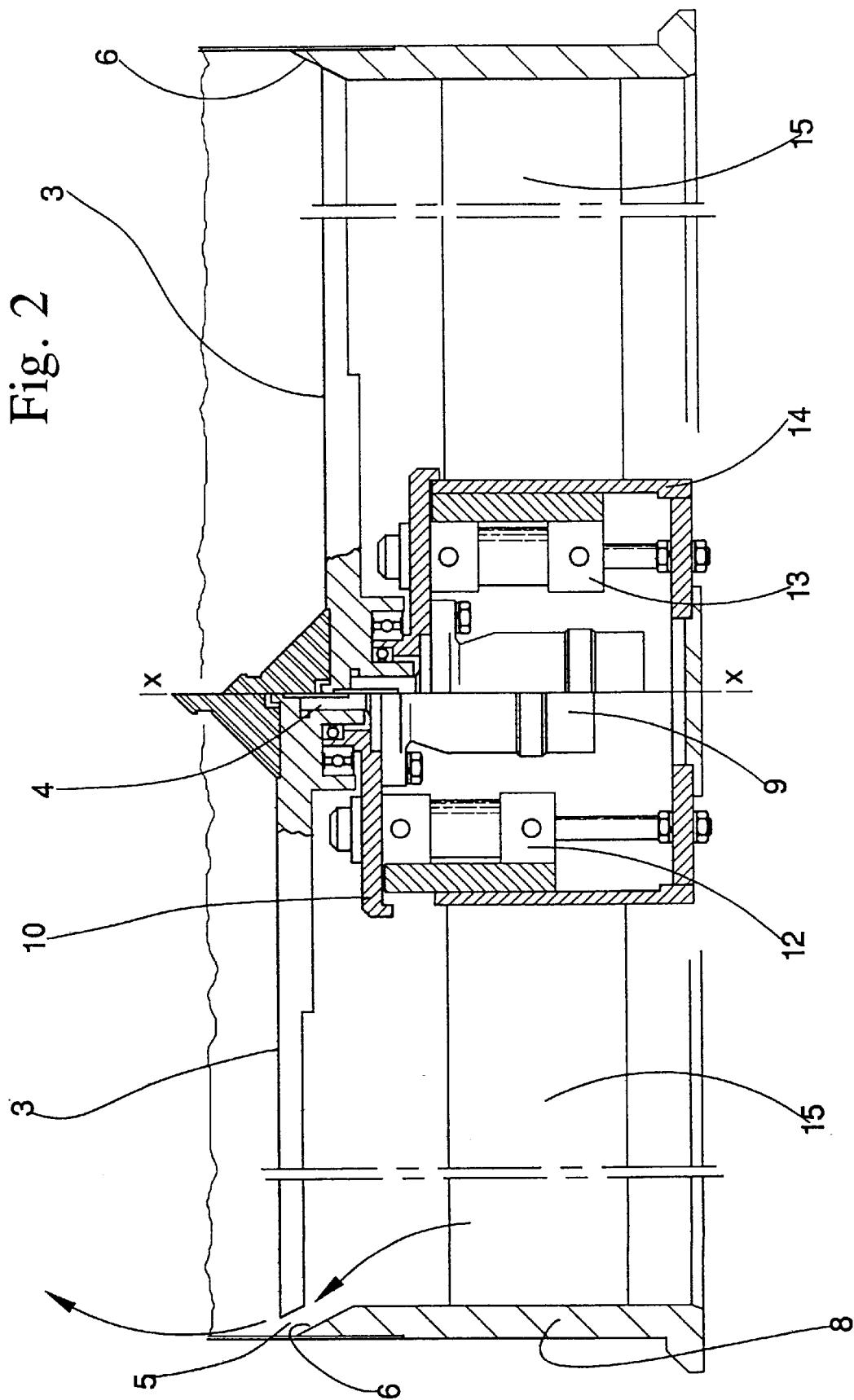

DEVICE FOR FORMING AND COATING SOLID PARTICLES

BACKGROUND OF THE INVENTION

Technical Field of the Invention

The invention relates to a device for forming and coating solid particles. Specifically, but not exclusively, the invention can be used for carrying out various types of process, widely used in, for example, the pharmaceutical industry, such as granulation, spheroid-shaping, and coating of solid particles with a film, and other applications besides.

In particular the invention relates to a device comprising a container in which a disc can rotate about a vertical rotation axis: a process gas can be introduced into the container through an annular passage, comprised between the periphery of the disc and a wall of the container, the size of the aperture being adjustable by vertical movements of the disc; internally of the container and above the disc a process liquid or powder can be introduced, which can be for example a product destined to coat the solid particles, or a mixture from which solid particles can be separated (granules, pellets or the like); during the process the solid particles, which are moved by the rotating disc, form a fluid bed of particles supported by the disc itself and the ascending flow of the process gas.

PRIOR ART

A device of this type exists in the prior art, for example in U.S. Pat. No. 5,284,678, which relates in particular to an apparatus for the coating of solids. This apparatus is provided with a motor for controlling the rotation of the disc, namely a horizontal-axis electric motor which transmits drive to the disc through a support and drive-transmit group having a horizontal-axis input shaft connected to the motor and a vertical-axis output shaft connected to the disc. The electric motor is arranged externally to the container, while the support and transmit group is situated below the disc and internally of a tubular wall crossed by the process gas flow. A rotation-speed regulator device is provided between the motor and the support and transmit group, which device can be manually activated by an operator, using, for example, a crank wheel.

One of the drawbacks of the above-described prior art consists in the high energy dissipation of the various transmission mechanisms going from the motor to the disc, especially in the support and transmit group and the speed regulator.

A further drawback is represented by the fact that the regulation of the vertical position of the disc, which regulates the inflow of process gas into the chamber, is usually done manually by means of a worm-worm screw couple, and is thus approximative and impractical.

A still further drawback is that the disc rotation speed regulation is done manually, which is laborious and relatively impractical.

A still further drawback of known type devices is that the disc-activating motor and the relative drive transmission mechanisms are massive and unwieldy, which leads to the necessity, in the prior art, for the disc actuating motor group to be located externally of the container in which the disc itself operates.

To this it can be added that in the prior art the external collocation of the motor group serves also to dissipate heat energy created by the motor in a way that is safe and unpolluted by the process gas.

OBJECT AND SUMMARY OF THE INVENTION

The present invention simply and economically obviates the above-mentioned drawbacks in the prior art by affording a simple and practical way of achieving an accurate and overall control of the breadth of the annular passage of the process gas in correlation with the disc rotation speed.

The invention considerably reduces the mass of the disc rotation motor group as well as providing, in a relatively compact structure, means for commanding disc rotation and disc raising and lowering.

A still further advantage is that it rapidly and simply enables the whole modular block of the apparatus, including the frame and the external cover, as well as the motor, to be removed and, if necessary, substituted.

A yet further advantage is constituted by the considerable energy saving achieved in comparison with the prior art.

These aims and advantages and others besides are all achieved by the invention, as it is characterised in the appended claims.

SUMMARY OF THE INVENTION

In particular the invention relates to a device comprising a container in which a disc can rotate about a vertical rotation axis: a process gas can be introduced into the container through an annular passage, comprised between the periphery of the disc and a wall of the container, the size of the aperture being adjustable by vertical movements of the disc; internally of the container and above the disc a process liquid or powder can be introduced, which can be for example a product destined to coat the solid particles, or a mixture from which solid particles can be separated (granules, pellets or the like). During the process the solid particles, which are moved by the rotating disc, form a fluid bed of particles supported by the disc itself and the ascending flow of the process gas.

BRIEF DESCRIPTION OF THE DRAWINGS

Further characteristics and advantages of the present invention will better emerge from the detailed description that follows of a preferred but nonexclusive embodiment of the invention, illustrated purely by way of nonlimiting example in the accompanying figures of the drawings, in which:

FIG. 1 is a schematic vertical elevation of a device made according to the invention, with some parts removed better to evidence others;

FIG. 2 shows, in enlarged scale and according to a vertical-plane section, a detail of the device of FIG. 1, in two operating configurations;

FIG. 3 is an enlarged-scale view of a detail of the device of FIG. 1 in a section according to line III—III of FIG. 1;

FIG. 3A is an enlarged view of circled Area A in FIG. 3.

DESCRIPTION OF THE PREFERRED EMBODIMENTS

Figure 5:
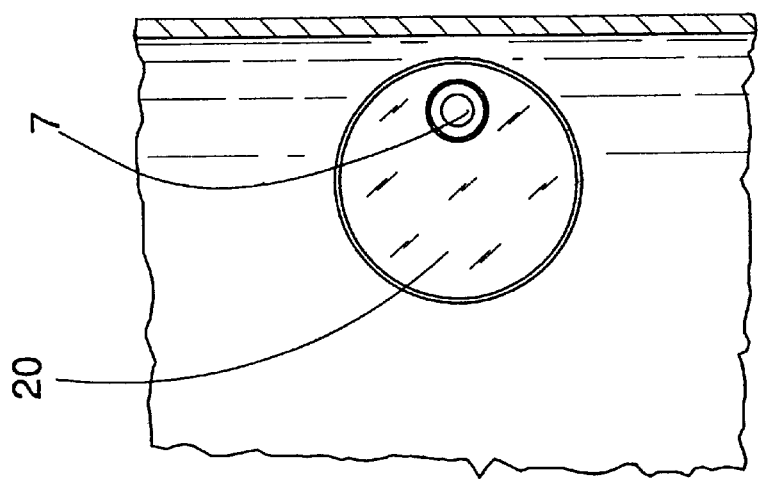
FIG. 5 is a diagram of the motor hydraulic transmission circuit commanding the disc movement.
Figure 4:
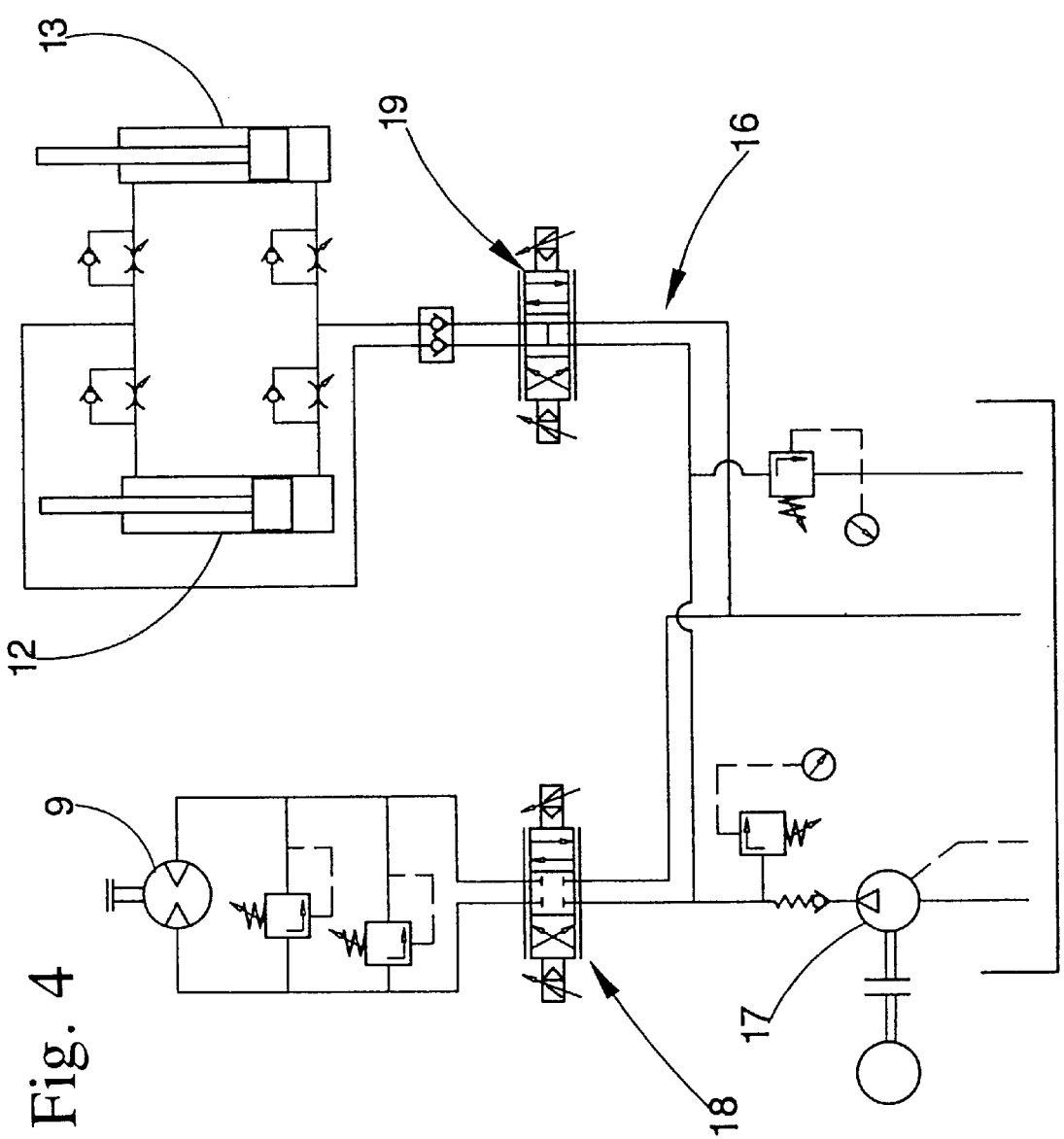
FIG. 4 is a schematic view from above of FIG. 3.

With reference to the figures, 1 denotes in its entirety a device for forming and coating solid particles. In particular, the device can be used both as a granulator and a coater of particles.

The device comprises a container 2 whose walls define a process chamber 2' in which the desired process is carried out, for example granulation. In the case in point, the container is extended in height and exhibits a lateral wall which is vertically axial-symmetric.

The process chamber is interiorly delimited by a rotating disc 3, horizontally arranged and commanded in rotation by a rotor 4 having a vertical axis which is coaxial with respect to the container 2.

On command the disc 3 can be displaced vertically in both directions as well as being selectively positionable in a rest position (see the right side of FIG. 2), in which the process chamber is closed, and can also assume at least one working position (the left side of FIG. 2) in which an annular passage 5 is defined between the disc periphery and a truncoconical tract 6 of wall. The peripheral extremity of the disc 3 exhibits an inclined surface 6' with which said disc 3 can perfectly engaged truncoconical tract 6 of wall in the interior closed position of the annular passage 5, so that the chamber is thus sealedly closed. The breadth of the annular passage 5 is adjustable by means of controlled vertical movements of the disc 3.

Means are provided for introducing a process liquid and/or powders into the chamber above the disc 3. These means preferably comprise at least one nozzle 7 able to introduce the liquid according to a direction which is not incident with the vertical rotation axis x—x of the rotor. In other words the single nozzle 7 is conformed and arranged to inject the liquid (or powders) in a direction which is substantially tangential to the walls of the container 2 and/or in relation to the rotating disc 3.

The device 1 further comprises means for introducing a process gas into the chamber from the bottom, through the annular passage 5. The inflow of the process gas into the chamber is regulated by a controlled modifying of the annular passage 5 breadth. The regulation of the gas inflow enables the conditions under which the process is carried out to be varied.

Below the disc 3 is a vertical-axis tubular segment 8, through which the process gas flows before entering the chamber. In the example shown the tubular segment 8 is cylindrical and coaxial to the rotating disc 3. At its top end the tubular segment 8 exhibits the truncoconical tract 6, which constitutes the seat on which the periphery of the disc 3 rests in the closed position.

The rotation of the rotor 4 is commanded by a fluid-dynamic motor 9 preferably comprising a rotary hydraulic motor 9 whose vertical-axis drive shaft represents in effect the rotor 4 bearing the disc 3. The fluid-dynamic rotary motor 9 is provided with known means for simply and precisely externally regulating the rotation speed of the drive shaft.

The vertical displacements of the disc 3 are also commanded by fluid-dynamic motor means, comprising at least one linear actuator, preferably hydraulic. In the example shown two vertical-axis actuators 12 and 13 are provided, which operate on the support 10 in such a way to reciprocally and solidly raise and lower both the disc 3 and the hydraulic motor 9. The two hydraulic actuators 12 and 13 are mounted internally of a box-shaped support base 14 solidly constrained to the internal wall of the tubular segment 8 by means of radial ribbings 15.

The device is provided with means for detecting the position of the disc 3 in a vertical direction. The detecting means are preferably associated to at least one of the above-described linear actuators 12 and 13 for raising and lowering the disc 3 and can comprise for example a conventional linear potentiometer (of known type and not illustrated) or any other mechanical or electromagnetic device for detecting the position of the mobile elements of the actuators 12 and 13. This solution enables the disc 3 to be positioned heightwise, and thus the inflow of process gas into the chamber to be controlled, automatically and with considerable precision.

Both the motor 9 and the two linear actuators 12 and 13 are grouped internally of the support base 14 which is situated immediately below the disc 3 and internally of the tubular segment 8. The support base 14, together with the motors contained therein, are located in the central part of the tubular segment 8, coaxially with respect to the segment itself. This arrangement means that a wide annular space can be left free for the passage of the process gas, between the wall of the tubular segment and the motor.

The motor 9 and the linear actuators 12 and 13 are supplied by a hydraulic transmission circuit 16, a diagram of which is provided in FIG. 5. The circuit 16 comprises a supply pump 17 actuated by a motor, in which both the pump 17 and the motor 17' are external of the device 1 and thus also external of the segment 8.

Two four-way and three-position proportional distributors 18 and 19 regulate the distribution of the pressurised fluid to the motor and, respectively, to the linear actuators 12 and 13. By acting on the proportional distributors 18 and 19 continuous variation of the functioning parameters of the motor 9 and the linear actuators 12 and 13 can be achieved, with extreme precision and simply and practically.

The hydraulic circuit 16 which supplies the rotary motor and the linear actuators with the pressurised fluid can comprise flexible pipes (not illustrated) connected at one end thereof to the fluid supply pump 17 and at the other end thereof, by removable attachments, to connections predisposed on the external surface of the tubular segment 8. The above-mentioned connections are set at the ends of conduits connected to the hydraulic motor 9 and the linear actuators 12 and 13.

The tubular segment 8, the disc 3 and the motor for commanding the movement of the disc are grouped in such a way as to form a single block (substantially, this block is constituted by the entirety of the elements represented in FIG. 2) which block is completely contained internally of the tubular segment 8. This single block can be made in such a way as to be removable, for example by lateral uncoupling, with respect to the rest of the device, especially with regard to the walls of the container 2 which define the portion of the chamber positioned above the segment 8. Before removing the block, the flexible pipes (not shown) supplying the motor internal of the segment itself should be detached from the tubular segment 8. The removal of the block enables the portion of chamber normally overlying it to be used for different processes.

The presence of devices of known type for the fluid-dynamic control (hydraulic in the present example) of the motor 9 and the linear actuators 12 and 13, which command the vertical displacements of the disc 3, make possible an easy acquisition of the characteristic functioning parameters and, therefore, an easy regulation, reproduction and control of the parameters governing a single process.

The device 1 is also provided with means for regulating the distance of the nozzle 7 from the rotation axis x—x of the disc 3. These means for regulating comprise a round support 20 rotatably coupled in a seat afforded on a wall of the container 2 and on which the nozzle 7 is eccentrically mounted. The support 20 is rotatable about a rotation axis y—y which is parallel to the nozzle emission direction 7.

The peripheral surface of the support 20 is rotatably coupled, with a cylindrical surface arranged in proximity of an aperture 21 made in the walls of the container 2.

The rotations of the support 20 enable the nozzle 7 to be displaced parallel on itself in such a way as to vary the distance thereof from the centre of the container 2 and from the disc 3 rotation axis. In this way the nozzle liquid emission direction is always tangential.

The radial displacement of the nozzle 7 is very important, since it affords the possibility of modifying the characteristics of the product obtainable in the process chamber. In other words, the distance of the nozzle 7 from the centre of the chamber influences the progress of the process during the functioning of the device.

The functioning of the device, for example when it is functioning as a granulator, involves the introduction of a liquid and/or powder mixture by tangentially-directed spraying through one or more nozzles 7 situated above the disc 3, which is set in rotation at a predetermined speed. The process gas enters the chamber from below, through the annular passage 5 situated at the base of the chamber.

The ability to act on the process parameters, which is indispensable for guaranteeing, among other things, a perfect repeatability of the various processes (necessarily discontinuous in type) is made possible, and is indeed very easy to actuate thanks to the structure of the invention, in which the control characteristics can be easily integrated from the point of view of process management.

The device, as has been mentioned, can operate not only as a granulator, but also, for example, as a particle coater.

What is claimed:

1. A device for forming solid particles, comprising:

a container (2) having a wall which defines a process chamber (2')and a tubular extension (8) below the process chamber (2');

the tubular extension having an annular rest position (6) therein;

a single rotatable disc (3) housed in the tubular extension (8) delimiting the process chamber (2');

said single rotatable disc being solid throughout;

a first motor (9) with a vertical shaft (4) housed in the tubular extension (8) fixed to the rotatable disc (3);

adjustment means (12, 13) housed in the tubular extension (8) and fixed to the rotatable disc (3) for moving the rotatable disc (3) vertically between engagement with the annular rest position (6) and an operating position within the process chamber (2');

wherein said process chamber (2') is completely closed from the tubular extension when the rotatable disc is engaged on the annular rest position;

wherein when the rotatable disc (3) is in an operating position, an annular passage (5) is defined between a periphery of the rotatable disc (3) and the annular rest position (6);

means for introducing a process gas into the process chamber (2') through said tubular extension (8) and said annular passage (5);

nozzle means (7) located above the rotatable disc (3) for introducing process liquids and powder into the process chamber (2');

a second motor (17') spaced apart from container (2) for actuating the first motor (9) and adjustment means (12, 13);

wherein the rotatable disc (3), the first motor (9) and the adjustment means (12, 13) are together removable intact from the tubular extension through the process chamber.

2. The device of claim 1, wherein the first motor and the adjustment means are actuated by a fluid hydraulic system having a supply pump (17) driven by the second motor (17').

3. The device of claim 1, wherein the adjustment means comprise at least one linear actuator, having detection means for determining a position of the linear actuator when actuated.

4. The device of claim 1, a mount fixed within the tubular extension, the first motor being separably engaged on the mount and spaced apart from interior walls of the tubular extension.

5. The device of claim 1, wherein the first motor is arranged in a central part of the tubular extension to define an annular space between the wall of the tubular segment and the first motor.

6. The device of claim 1, wherein said nozzle means (7) is radially displaceable.

7. The device of claim 6, wherein the nozzle means introduces process and gases into the process chamber (2') into a direction not incident to a vertical rotation axis of the shaft (4) by regulating a distance of the nozzle means (7) from the vertical rotation axis of the shaft (4).

8. The device of claim 7, wherein the regulation means comprise a support engaged rotatably to a wall of the container (2) on which the nozzle means are mounted eccentrically.

* * * * *